(12) United States Patent
Kubozono et al.

(10) Patent No.: US 9,014,937 B2
(45) Date of Patent: Apr. 21, 2015

(54) FRONT WHEEL DIFFERENTIAL LOCK CONTROL SYSTEM FOR STRADDLE-RIDE TYPE FOUR-WHEELED VEHICLE

(75) Inventors: Munehiro Kubozono, Wako (JP); Tatsuya Shiokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/306,033

(22) Filed: Nov. 29, 2011

(65) Prior Publication Data

US 2012/0150404 A1 Jun. 14, 2012

(30) Foreign Application Priority Data

Dec. 10, 2010 (JP) ................................. 2010-275974

(51) Int. Cl.

| G06F 7/00 | (2006.01) |
|---|---|
| G06F 17/00 | (2006.01) |
| G06F 19/00 | (2011.01) |
| B60T 7/12 | (2006.01) |
| G05D 1/00 | (2006.01) |
| G06G 7/70 | (2006.01) |
| F16H 48/20 | (2012.01) |

(52) U.S. Cl.
CPC .......... *F16H 48/20* (2013.01); *F16H 2048/204* (2013.01)

(58) Field of Classification Search
CPC ........ F16H 48/00; F16H 48/20; B60W 10/12; B60W 10/14; B60W 10/16
USPC .......... 701/69, 88, 89; 477/35; 180/233, 248, 180/249; 123/197.1, 197.5
See application file for complete search history.

(56) References Cited

U.S. PATENT DOCUMENTS

| 3,871,249 | A | * | 3/1975 | Jeffers | 475/86 |
|---|---|---|---|---|---|
| 5,026,335 | A | * | 6/1991 | Oftedal et al. | 475/198 |
| 5,092,436 | A | * | 3/1992 | Sterler | 192/221 |
| 6,085,138 | A | * | 7/2000 | Smith et al. | 701/51 |
| 6,976,553 | B1 | * | 12/2005 | Dahl et al. | 180/247 |
| 7,766,116 | B1 | * | 8/2010 | Sherrod | 180/245 |

(Continued)

FOREIGN PATENT DOCUMENTS

| JP | 05085217 A | * | 4/1993 | ............. B60K 23/04 |
|---|---|---|---|---|
| JP | H05-085217 | | 4/1993 | |

(Continued)

*Primary Examiner* — Yonel Beaulieu
*Assistant Examiner* — Lail Kleinman
(74) *Attorney, Agent, or Firm* — Rankin, Hill & Clark LLP

(57) ABSTRACT

A front wheel differential lock control system for a straddle-ride type four-wheeled vehicle is provided that can reliably switch a differential locking mechanism into a lock state in a low vehicle-speed state. In an engine provided with a manual transmission having forward five-speed and reverse gears, only in a low gear ratio state ($1^{st}$ through $3^{rd}$ gears) is actuation of a diff-lock actuator permitted to switch a front wheel differential mechanism into a differential lock state. When a diff-lock operation is operated on the time of selection of third-, fourth- or fifth-speed gear, engine rotation number control is exercised to allow an engine rotation number to converge on a predetermined upper limit value. In an engine provided with a start clutch or a torque converter, actuation of the diff-lock actuator is permitted only in a low engine rotation number state where drive force is not transmitted to the front wheels.

6 Claims, 12 Drawing Sheets

(56) References Cited

U.S. PATENT DOCUMENTS

| | | | |
|---|---|---|---|
| 2001/0025734 A1* | 10/2001 | Nishida et al. | 180/248 |
| 2002/0070066 A1* | 6/2002 | Nakamura | 180/249 |
| 2004/0195028 A1* | 10/2004 | Izumi | 180/249 |
| 2008/0076630 A1* | 3/2008 | Fayyad et al. | 477/35 |
| 2008/0081731 A1* | 4/2008 | Scheer et al. | 477/35 |
| 2009/0012692 A1* | 1/2009 | Nakamura | 701/102 |
| 2009/0209382 A1* | 8/2009 | Tabata et al. | 475/5 |

FOREIGN PATENT DOCUMENTS

| | | |
|---|---|---|
| JP | 2001-277886 | 10/2001 |
| JP | 2002-172951 | 6/2002 |

* cited by examiner

| | FIVE-SPEED MANUAL (ELECTRIC MANUAL) TRANSMISSION | HYDRAULIC MECHANICAL TYPE CONTINUOUSLY VARIABLE TRANSMISSION | THREE-SPEED AUTOMATIC TRANSMISSION AND TORQUE CONVERTER |
|---|---|---|---|
| DIFF-LOCK MOTOR OPERATION PERMISSION CONDITION | FIRST-SPEED, SECOND-SPEED OR REVERSE | LESS THAN DRIVE FORCE PRODUCTION ROTATION NUMBER | FIRST-SPEED AND LESS THAN DRIVE FORCE PRODUCTION ROTATION NUMBER |
| SPEED LIMITING METHOD AFTER OPERATION OF DIFF-LOCK MOTOR (COMMON TO DIFF-LOCK FITTING STATE AND NOT-YET-FITTING STATE) | NO-LIMITATION FOR FIRST-SPEED, SECOND-SPEED OR REVERSE ENGINE CONTROL ROTATION FOR THIRD-, FOURTH- OR FIFTH-SPEED | LIMITING SHIFT RATIO | ENGINE ROTATION NUMBER CONTROL FOR FIRST- AND SECOND-SPEED PROHIBITING UPSHIFT TO THIRD-SPEED |

FIG. 12

FRONT WHEEL DIFFERENTIAL LOCK CONTROL SYSTEM FOR STRADDLE-RIDE TYPE FOUR-WHEELED VEHICLE

BACKGROUND OF THE INVENTION

1. Field of the Invention

The present invention generally relates to a front wheel differential lock control system for a straddle-ride type four-wheeled vehicle and, more particularly, toward such a control system in which a switch between lock and unlock states of a front wheel differential gear is accomplished by the drive force of an actuator.

2. Description of Related Art

A straddle-ride type four-wheeled vehicle as an ATV (All Terrain Vehicle) may lose drive force during traveling through mud, a bog, quagmire or the like, for example, in four-wheel drive (4WD) state because of spinning of one of front wheels. In such a case, left and right axles have heretofore directly been connected to each other by locking (diff-locking) a differential gear of the front wheels, thereby ensuring the drive force. The switching between the unlock and lock states of the differential gear is performed generally by allowing an actuator (a diff-lock actuator) such as a motor or the like to drive a differential locking mechanism in response to the operation of an electric switch installed on a steering handle-bar or the like.

Incidentally, if the differential gear of the front wheels is locked, a rotational difference does not occur between the left and right wheels. This leads to a state unsuitable for turning traveling and high-speed traveling. Therefore, it is conceivable that switching to the lock state of the differential locking mechanism is permitted only under certain predetermined conditions.

Japanese Patent Laid-open No. 2002-172951 discloses a differential lock control system that permits switching the differential locking mechanism into the lock state, that is, that permits the drive of a diff-lock actuator only if vehicle speed detected by a vehicle speed sensor is equal to or less than a predetermined value.

However, the technology described in Japanese Patent Laid-open No. 2002-172951 detects vehicle speed on the basis of the rotational speed of a wheel detected by a rotation sensor installed on the wheel. In the state where the wheel is slipping, the vehicle speed detected by the vehicle speed sensor may be high although the actual speed of the vehicle body is low. Thus, a phenomenon may probably occur in which switching to a differential lock state is not permitted in the slip state where an occupant desires the switching into the differential lock state.

The differential locking mechanism is usually configured such that even if a diff-lock actuator is actuated, switching into a lock state will not be completed as long as a difference in rotation number occurs between left and right wheels. Although differential lock control is exercised during low vehicle-speed, vehicle speed may probably increase with a lock waiting state remaining. To prevent switching into the lock state in the high vehicle-speed state, this case needs the following. A threshold level of vehicle speed at which the drive of the diff-lock actuator is permitted is allowed to have hysteresis. Alternatively, engine control is exercised so that vehicle speed does not rise over a predetermined value. Thus, there is a problem of complicated control contents.

SUMMARY OF THE INVENTION

Accordingly, it is an object of the present invention to solve the problem of the conventional technology described above and to provide a front wheel differential lock control system for a straddle-ride type four-wheeled vehicle that can reliably switch a differential locking mechanism into a lock state in a low vehicle-speed state.

In accordance with the present invention, a front wheel differential lock control system for a straddle-ride type four-wheeled vehicle, includes: a differential mechanism for producing a rotational difference between a pair of left and right front wheels driven by an engine; a diff-lock actuator for switching the differential mechanism into a differential lock state so as not to produce the rotational difference between the front wheels in response to operation of an operation switch; and a control section for drivingly controlling at least the diff-lock actuator. The front wheel differential lock control system further includes at least one of gear ratio detector, which detects a gear ratio of a transmission of the engine, and engine rotation number detector, which detects an engine rotation number of the engine. If a predetermined low gear state is detected by the gear ratio detector or if a low engine rotation number state in which drive force is not produced in the front wheels is detected by the engine rotation number detector, the control section permits actuation of the diff-lock actuator upon detection of the operation of the operation switch.

Therefore, "the predetermined low gear ratio" or "the engine rotation number at which the predetermined drive force is not produced" can be set as the actuation permission condition of the diff-lock actuator. In this way, and unlike the case where "vehicle speed" is applied as the actuation permission condition of the diff-lock actuator, the present invention avoids the situation in which differential lock control is not appropriately exercised due to the false recognition of vehicle speed resulting from the slip of a wheel. The appropriate differential lock control can be exercised. In other words, it is not determined that vehicle speed is high because of the slip of a wheel, so that special control such as provision of hysteresis of a vehicle-speed threshold is not necessary.

Although vehicle speed increases after the actuation of the diff-lock actuator, it will not exceed the predetermined upper limit as long as the transmission is at the predetermined low gear ratio. Therefore, even if the differential lock waiting state (resulting from, e.g., the lost motion mechanism) occurs, it can be expected to smoothly switch into the lock state in the low vehicle-speed state.

Further, when the differential lock is permitted at the low engine rotation number at which the drive force of the wheels is not produced, the diff-lock actuator is actuated with the drive force of the front wheels lost. Therefore, a difference in rotation number between the left and right front wheels is easy to occur, so that it becomes easy to complete the switching into the differential lock state. When starting the vehicle from the drive force losing state, an operator usually selects a low gear ratio to obtain drive torque. Therefore, the lock waiting state of the differential mechanism can be produced in the low-speed state also without the necessity of the special control.

In further accordance with the present invention, the control section determines that, when it is detected that the transmission of the engine is in a state where a first gear, second gear, or reverse gear is selected, the transmission is in the predetermined low gear ratio state. The control section includes an engine rotation number limiter that limits, when the engine rotation number is equal to or greater than a predetermined value in a state where the transmission is not determined to be in the low gear ratio state, the engine rotation number to a level not exceeding a fixed upper limit value.

If the transmission is at the low gear ratio, i.e., at the reverse gear, first gear or second gear in the period (the lock waiting state) from the actuation of the diff-lock actuator to the actual lock of the differential gear, there is not any limitation. Thus, it is not necessary for the operator to pay special attention even after the actuation of the diff-lock actuator.

On the other hand, if the transmission is shifted to the speed-change stage (e.g., third-, fourth-, or fifth speed), which is not at a low gear ratio in the lock-completion waiting state of the differential locking mechanism, the engine rotation number is limited. Therefore, the operator can similarly recognize a feeling of limiting the engine rotation number and the occupant can recognize that the differential locking mechanism is in the differential lock waiting state.

Even in the differential lock state, the engine rotation number is limited at the same rotation number. Therefore, a feeling of limitation is the same as that in an increase in engine rotation number after shifting. Thus, the vehicle will not travel in the differential lock state and at a high engine rotation number, which can reduce an influence on the durability of drive-train component parts.

In further accordance with the present invention, if a gear ratio is changed to a high gear ratio in which a gear ratio is not in the low gear ratio state during travel in the low gear ratio state at the engine rotation number equal to or greater than the fixed upper limit value, the engine rotation number limiter exercises control so that the engine rotation number converges on the fixed upper limit value by gradually increasing the degree of reduction of the engine rotation number.

For example, if the transmission is shifted to the third-speed during traveling at the second gear in the high engine rotation number state, the engine rotation number is limited by the engine rotation number limiter. However, the engine rotation number is not limited abruptly but limited in such a manner that the degree of reduction of the engine rotation number is gradually increased. Thus, the operator has a feeling of deceleration without a sense of discomfort.

In further accordance with the present invention, when exercising control so that the engine rotation number converges on the fixed upper limit value, the engine rotation number limiter exercises control so that as the engine rotation number is higher, the degree of reduction of the engine rotation number is decreased.

For example, if the transmission is shifted to the third-speed during traveling at the second gear in the high engine rotation number state, the engine rotation number limiter limits the engine rotation number. However, at this time, the limitation is started from the smaller degree of reduction with higher engine rotation number and the degree of reduction is gradually increased. Thus, the operator can obtain a feeling of smooth deceleration.

In further accordance with the present invention, if it is detected that the transmission of the engine is in a state where a first gear, second gear, or reverse gear is selected, the control section determines that the transmission is in the predetermined low gear ratio state, and if the actuation of the diff-lock actuator is permitted, the control section prohibits shifting to a third or more gear.

Therefore, a gear ratio at which the differential lock is permitted is limited, so that unnecessary shifting by the operator can be prohibited. Further, a load acting on the drive-train in the differential lock state and at a high gear ratio can be reduced, which leads to the improved durability and weight saving of the drive-train.

In further accordance with the present invention, the engine is provided with the start clutch or the torque converter in a transmission path of rotational drive force. In addition, a low engine rotation number state where drive force is not produced in the front wheels corresponds to a state equal to or less than a rotation number of drive force transmission start of the start clutch or the torque converter. Therefore, it is not necessary that the differential lock is permitted by lowering the engine rotation number at which the drive force is once disconnected and from such a state the clutch is operated with difficulty. In other words, shifting to the differential lock state can be done only by throttle operation to produce the drive force. Thus, the vehicle can smoothly escape from a place having poor traction.

In further accordance with the present invention, the engine includes a continuously variable transmission continuously varying a gear ratio, and the control section fixes the gear ratio of the continuously variable transmission at a predetermined low gear ratio in a state where actuation of the diff-lock actuator is permitted.

Therefore, it is possible to prevent a load from acting on the drive-train in the differential lock state and in the high gear ratio state. In addition, even in the state where the differential mechanism is in the lock waiting state, the differential mechanism is shifted to the differential lock state in the low-gear ratio state. Thus, a shock occurring at the time of locking can be reduced.

BRIEF DESCRIPTION OF THE DRAWINGS

These and further features of the invention will be apparent with reference to the specification and drawings, wherein:

FIG. 12 is a table illustrating contents of differential lock control in the transmissions of the three types.

DETAILED DESCRIPTION OF THE PREFERRED EMBODIMENTS

Figure 1:
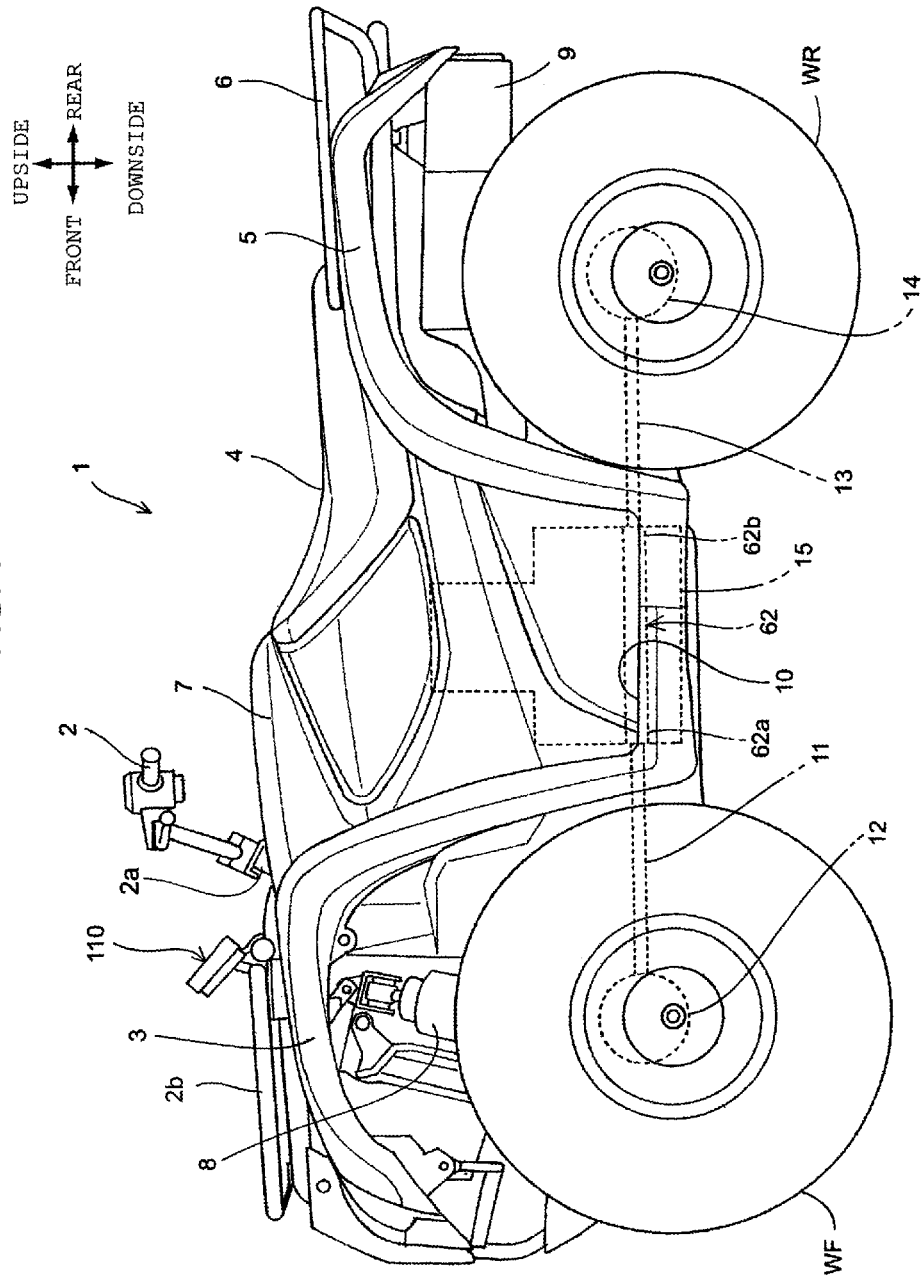
FIG. 1 is a lateral view of a straddle-ride type four-wheeled vehicle according to an embodiment of the present invention.

Preferred embodiments of the present invention will hereinafter be described in detail with reference to the drawings.

A straddle-ride type four-wheeled vehicle 1 is an ATV (All Terrain Vehicle) in which a straddle-ride type vehicle body an occupant strides and mounts is provided with low-pressure balloon tires for two wheels on the front side and two wheels on the rear side. Left and right front wheels WF are provided in the front lower portion of the vehicle body. In addition, a front fender 3 is disposed above each of the front wheels WF. Left and right rear wheels WR are provided in the rear lower portion of the vehicle body. A rear fender 5 is disposed above each of the rear wheels WR. A steering handlebar 2 for steering the front wheels WF is installed above the front wheels WF and a meter device 110 and a front luggage carrier 2b are mounted in front of the steering handlebar 2. A seat 4 and a rear luggage carrier 6 are mounted to the rear of the steering handlebar 2, which is secured to an upper end of a steering shaft 2a. A body cover 7 is disposed between the steering handlebar 2 and the seat 4. Left and right footrest floors 10 are installed below the body cover 7.

An engine 15 configured integrally with a transmission is disposed at the general center of the vehicle body. Combustion gas discharged from the engine 15 is discharged via a muffler 9 in the rear of the vehicle body. Power of the engine 15 is transmitted from a rear end portion 62b of a final output shaft 62 via a rear propeller shaft 13 and a rear differential mechanism 14 to the rear wheels WR. In addition, the power of the engine 15 is transmitted from a front end portion 62a of the final output shaft 62 via a front propeller shaft 11 and a front differential mechanism 12 to the front wheels WR. A differential gear incorporated in each of the differential mechanisms 12, 14 is a mechanism that divides the same torque from a power source for transmission while absorbing a rotational difference between the left and right wheels occurring during turning traveling.

The front differential mechanism 12 houses a 2WD/4WD switching mechanism to be described later. The four-wheeled vehicle can travel while arbitrarily making the switch between two-wheel drive (2WD) for driving only the rear wheels WR and four-wheel drive (4WD) for driving both the front and rear wheels. The respective front wheels WF are independently supported by a left and right front cushions 8.

Figure 2:
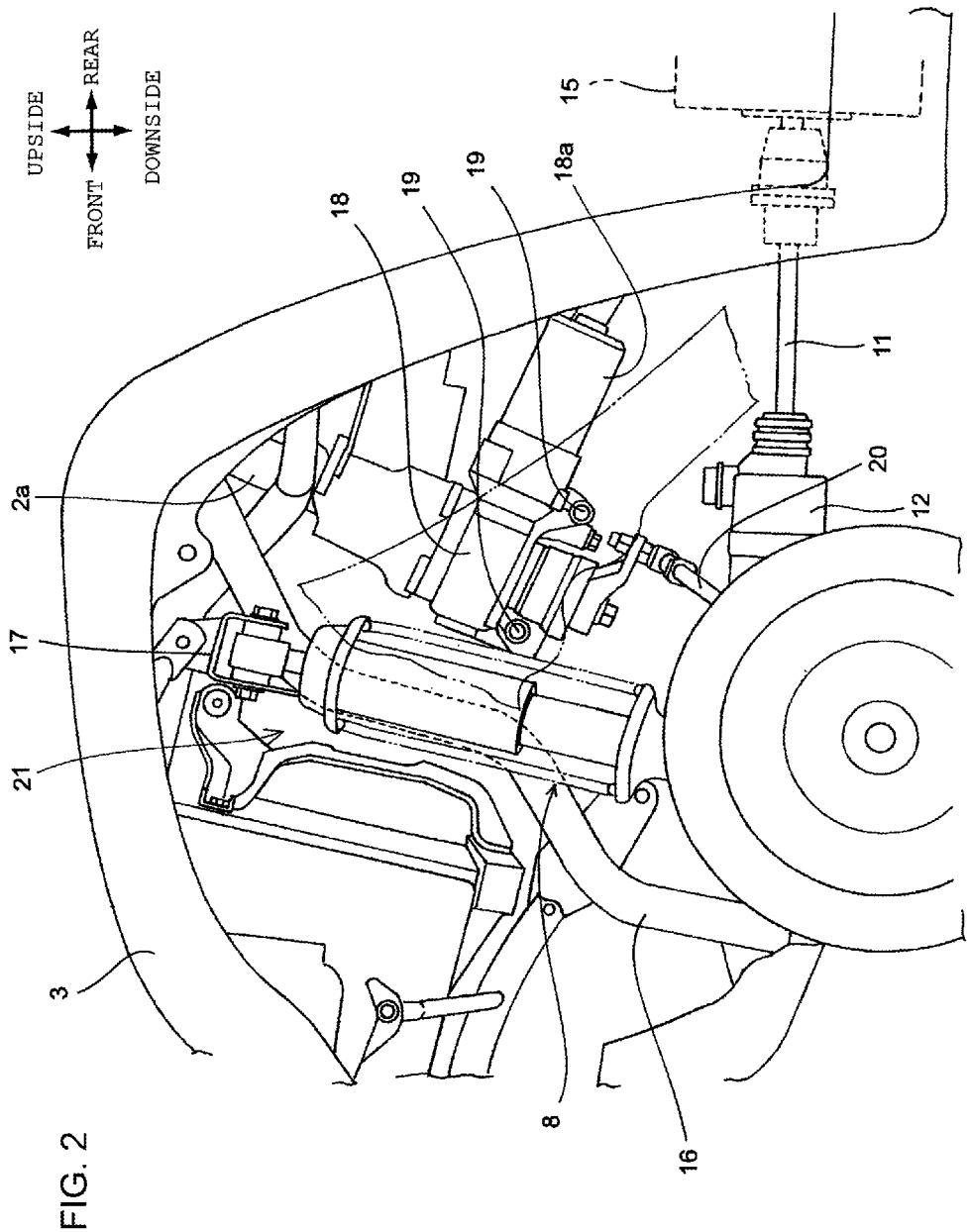
FIG. 2 is a left lateral view of the vehicle with a body cover removed.
Figure 3:
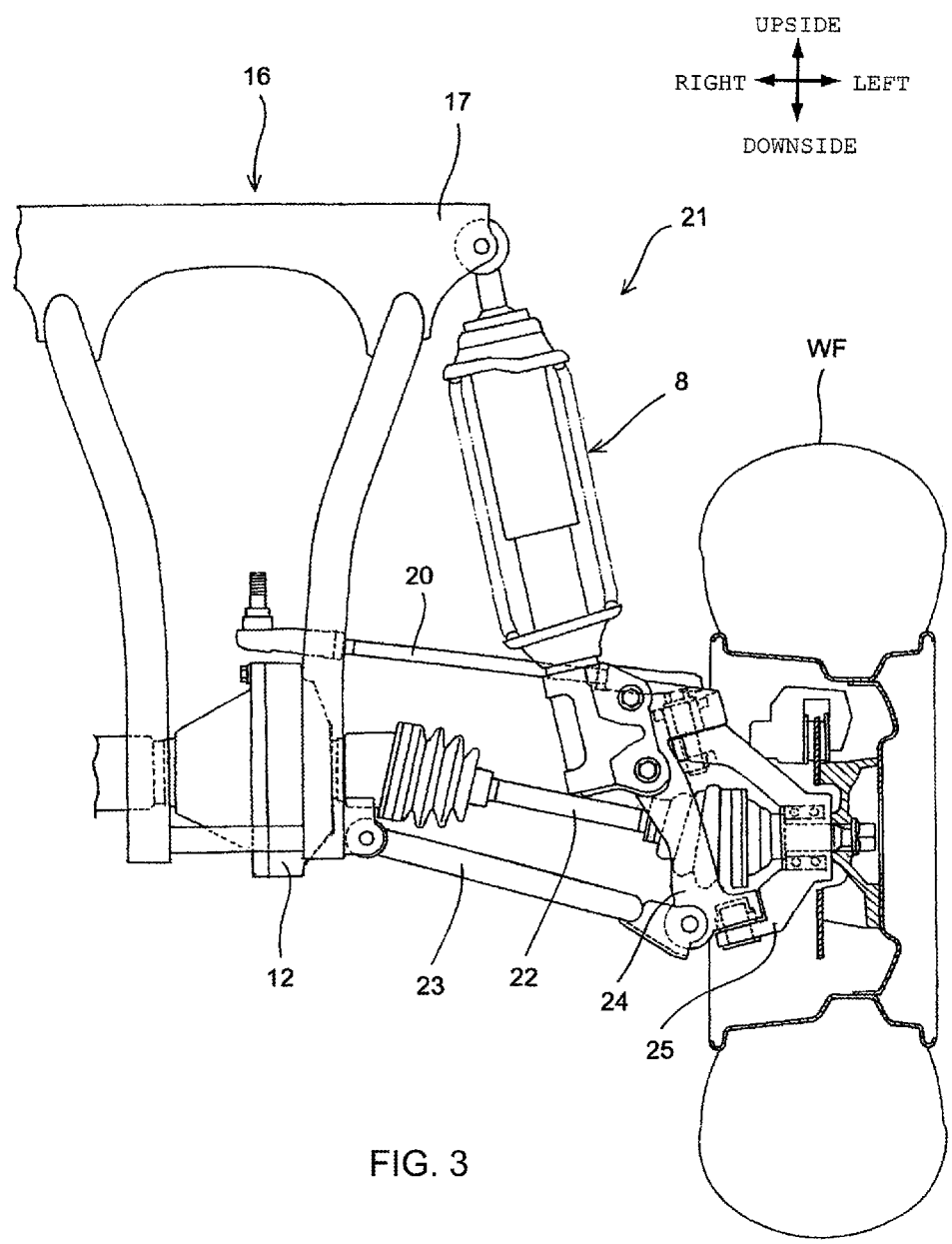
FIG. 3 is a front view of a front wheel suspension system.

Referring to FIGS. 2 and 3, the front differential mechanism 12 (hereinafter, also simply described as the differential mechanism) is supported by a body frame 16 at almost a vehicle-widthwise center. Power transmitted from the engine 15 via the front propeller shaft 11 is transmitted to the left and right front wheels WF via the corresponding drive shafts (the axles) 22 extending in the vehicle-width direction. The differential mechanism 12 can switch the differential gear into a lock state in response to occupant's operation so as not to cause a rotational difference between the left and right wheels.

A front suspension system 21 includes the front cushion 8, a knuckle support member 24, a lower arm 23, a knuckle 25 and a tie rod 20. The front cushion 8 is connected at its upper end to an attachment portion 17 of the body frame 16 and extends downward. The knuckle support member 24 extends downward from the lower portion of the front cushion 8. The lower arm 23 extends in the vehicle-width direction and connects the lower portion of the knuckle support member 24 with the body frame 16. The knuckle 25 is turnably attached to the knuckle support member 24 and supports the front wheel WF. The tie rod 20 is connected to the knuckle 25 and extends in the same direction as the drive shaft 22.

The tie rod 20 is coupled to an output shaft of a power steering unit 18. The power steering unit 18 allows an electric motor 18a to amplify the steering force applied to the steering shaft 2a coupled to the steering handlebar 2. This reciprocates the tie rod 20 in response to the operation of the steering handlebar 2. In response to the reciprocation of the tie rod 20, the knuckle 25 is turned to steer the front wheel WF. The power steering unit 18 is connected to the body frame 16 by bolts 19.

Figure 4:
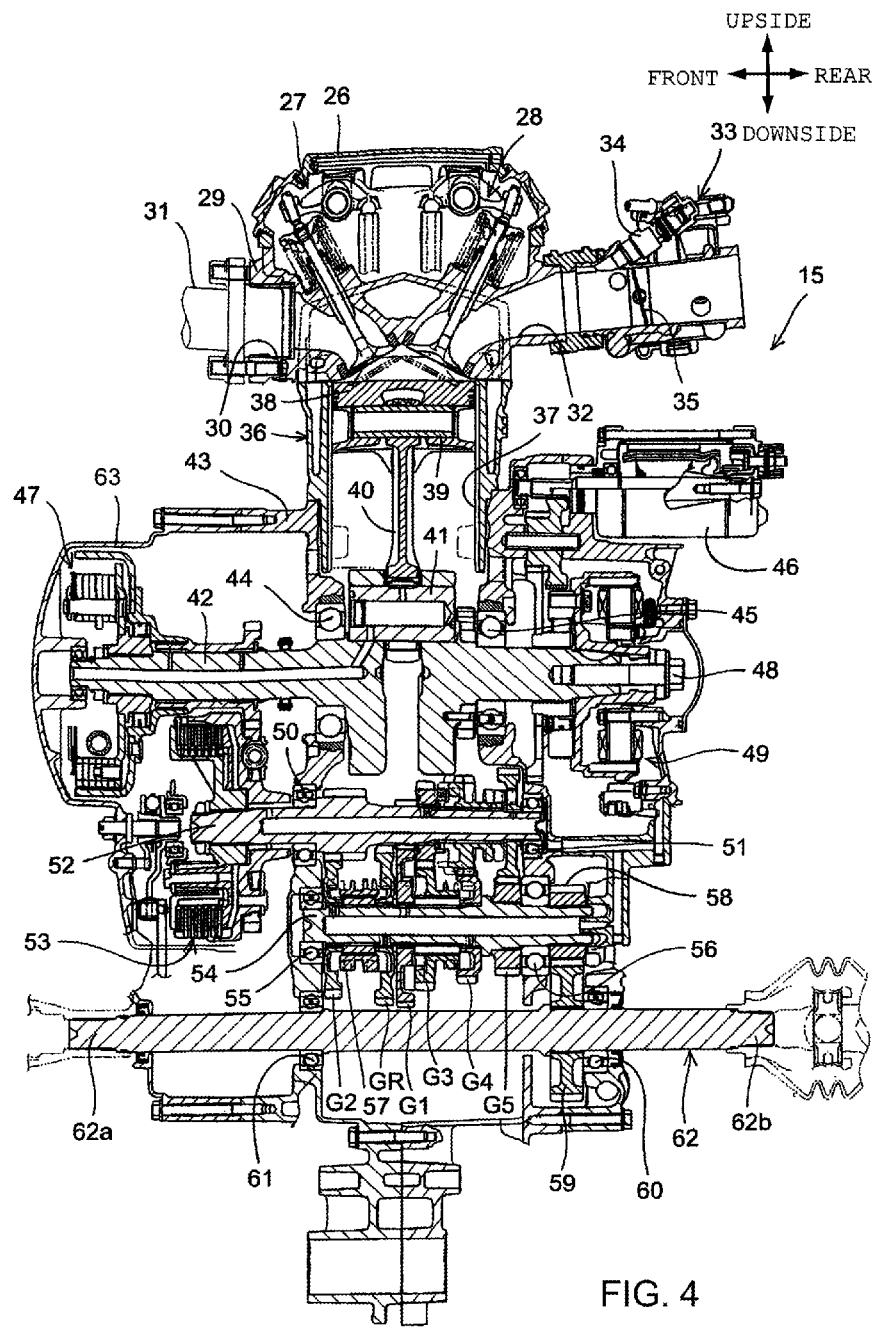
FIG. 4 is a cross-sectional view of an engine according to the embodiment of the present invention.

FIG. 4 is a cross-sectional view of the engine 15 according to the embodiment of the present invention. Four-directional arrows on the top right in the figure correspond to the vehicle-body direction of the straddle-ride type four-wheeled vehicle 1. The engine 15 is a single-cylinder four-cycle engine provided with a manual multistage transmission with five-forward and one-reverse gears. The engine 15 is provided with a start clutch 47 and a shift clutch 53 between a crankshaft 42 and the transmission. The start clutch 47 is composed of a centrifugal clutch, which does not transfer drive force until the rotation number of the engine exceeds a predetermined value. The shift clutch 53 connects and disconnects the transmission of the drive force in conjunction with the operation of a shift pedal. In this way, the engine 15 enables start and shift operations without the necessity of manual clutch operation. The front end portion 62a of the final output shaft 62 is coupled to the front propeller shaft 11 (see FIG. 1). On the other hand, the rear end portion 62b of the final output shaft 62 is coupled to the rear propeller shaft 13.

A piston 38 is slidably housed in a sleeve 37 embedded in a cylinder block 36. The piston 38 is pivotally supported by one end of a connecting rod 40 via a piston pin 39. The connecting rod 40 has the other end supported pivotally by the crankshaft 42 via a crankpin 41. A cylinder head 29 housing an intake valve mechanism 28 and an exhaust valve mechanism 27 is mounted on the upper portion of the cylinder block 36.

An injector 34 of a fuel injection device and a throttle body 33 having a throttle valve 35 are mounted on the upstream side of an intake port 32 of the cylinder head 29. On the other hand, an exhaust pipe 31 coupled to the muffler 9 (see FIG. 1) in the rear portion of the vehicle body is mounted on the downstream side of an exhaust port 30. A cylinder head cover 26 is mounted above a rocker arm for driving intake and exhaust valves.

The crankshaft 42 is rotatably supported by bearings 44, 45 provided on a crankcase 43. An AC generator 49 is secured to a right end portion, in the figure, of the crankshaft 42 via a bolt 48. The power of a starter 46 is transmitted to the crankshaft 42 via a gear located between the bearing 45 and the AC generator 49.

A clutch cover 63 is installed on the left, in the figure, of the crankcase 43. The start clutch 47 is mounted to the left end portion, in the figure, of the crankshaft 42. If the crankshaft 42 exceeds a predetermined rotation frequency, the start clutch 47 transmits the rotational power to a main shaft 52 of the transmission. The power inputted to the main shaft 52 supported rotatably by the bearings 50, 51 is reduced in speed by a shift gear pair installed between the main shaft 52 and a counter shaft 54. A second driven gear G2, a reverse driven gear GR, a first driven gear G1, a third driven gear G3, a fourth driven gear G4 and a fifth driven gear G5 are arranged in order from the left in the figure on the counter shaft 54 supported rotatably by bearings 55, 56. The shift gear pairs transmitting the power are switched therebetween in response to the operation of a shift sleeve 57 slidable in the axial direction, and the like. The power reduced in speed by a given shift gear pair is transmitted from a drive side output gear 58 attached to the right end portion, in the figure, of the counter shaft 54 via a driven side output gear 59 to the final output shaft 62 supported rotatably by bearings 60, 61.

Figure 5:
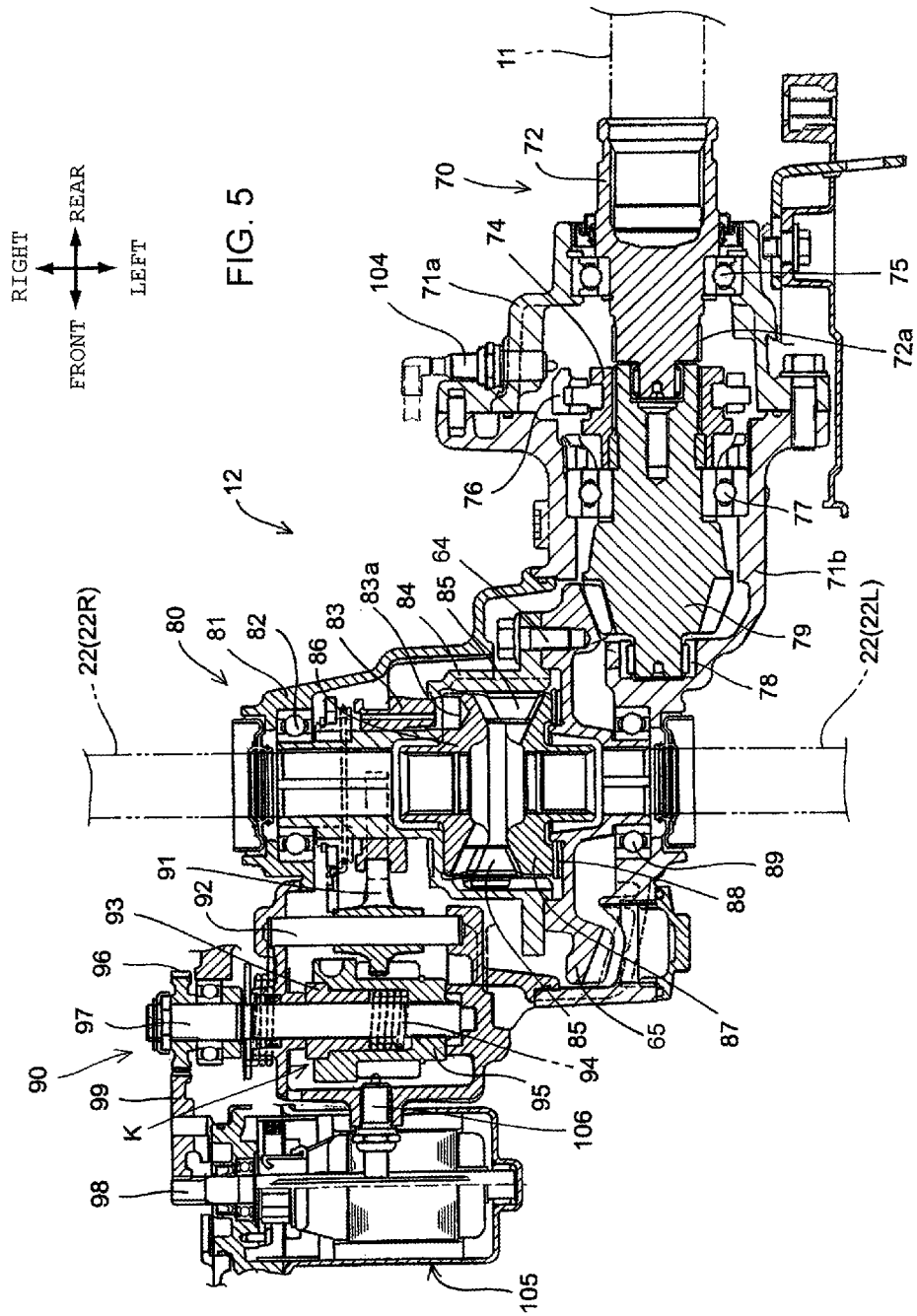
FIG. 5 is a cross-sectional view of a front wheel differential mechanism.

FIG. 5 is a cross-sectional view of the front wheel differential mechanism 12. Four-directional arrows on the top right in the figure correspond to the vehicle-body direction of the straddle-ride type four-wheeled vehicle 1. The differential mechanism 12 is composed of three main portions: a 2WD/

4WD switching mechanism 70, a differential gear portion 80 and a differential locking mechanism 90.

The 2WD/4WD switching mechanism 70 is housed in a rear case 71a and a front case 71b. The front propeller shaft 11 has a front end portion coupled to a power transmission joint 72 rotatably supported by a bearing 75 of the rear case 71a. The power transmission joint 72 has a left end portion, in the figure, formed with a spline 72a on its outer circumferential portion. A drive pinion gear 79 rotatably supported by bearings 77, 78 is housed in the front case 71b. As with the power transmission joint 72, the drive pinion gear 79 has a right end portion, in the figure, formed with a spline on its outer circumferential portion. An annular slide piece 74 is formed with a spline on its inner circumferential portion. If the slide piece 74 is slid in the right direction in the figure, the drive pinion gear 79 and the power transmission joint 72 are joined together through the splines for integral rotation. In this way, power is transmitted to the drive shaft 22 (22L, 22R) of the front wheel WF.

The slide piece 74 is axially slid by a slide arm 76 engaged with the slide piece 74 circumferentially slidably. A 4WD-state detection sensor 104 is attached to the rear case 71a. The 4WD-state detection sensor 104 detects switching from two-wheel drive to four-wheel drive on the basis of the slide of the slide arm 76 to a predetermined position. The 4WD-state detection sensor 104 can adopt an on-off switch, which detects, for example, the fact that a projecting-retractable detection element is pressed and retracted by the slide arm 76. The slide arm 76 can manually be driven by an occupant using a lever or the like (not shown) connected thereto via a wire or can be driven by an actuator (not shown) actuated in response to the operation of an electric switch.

The rotational power of the drive pinion gear 79 is converted in rotational direction from the anteroposterior direction of the vehicle body to the vehicle-width direction by a ring gear 65 housed in a case 81 of the differential gear portion 80. The ring gear 65 rotatably supported by the case 81 via a bearing 89 is secured to a differential case 84 via a plurality of bolts 64. The differential case 84 internally houses a left cam face 87 joined to the drive shaft 22L on the vehicle-widthwise left side; a right cam face 86 joined to the drive shaft 22R on the vehicle-widthwise right side; and a plurality of cam followers 85. An annular plate spring 88 is disposed between the left cam face 87 and the ring gear 65 so as to apply biasing force to the left cam face 87. In this way, the differential mechanism is configured which uses frictional force occurring between respective cam faces of both the cam faces 86, 87 and the corresponding cam followers 85.

A ring member having a diff-lock pin 83 is engaged with a cylindrical portion of the differential case 84. The diff-lock pin 83 is an operating element switching the differential mechanism into a lock state. The diff-lock pin 83 is formed cylindrically and extends in an axial direction. In addition, the diff-lock pin 83 passes through a single through-hole formed in the differential case 84 and a single pin hole 83a formed in the right cam face 86 to prohibit the relative rotation of both the differential case 84 and the right cam face 86 (to lock the differential gear), thereby switching the differential mechanism into a differential lock state where the left and right wheels are connected to each other.

The diff-lock pin 83 is configured to slide in the axial direction by a switching fork 91 slidably supported by the guide pin 92. The differential locking mechanism 90 driving the diff-lock pin 83 includes at least the diff-lock pin 83, a diff-lock actuator 105 as an electric motor, a shift drum 95 and the switching fork 91.

The present embodiment is configured as below. If a diff-lock operation switch (see FIG. 6) installed close to the steering handlebar 2 is operated with predetermined conditions satisfied, the diff-lock actuator 105 is driven to switch the differential mechanism into the differential lock state.

The rotational power of the diff-lock actuator 105 is transmitted from a pinion gear formed on an output shaft 98 via a first reduction gear 99 and a second reduction gear 96 to a shift shaft 97. A lost motion spring 94 is disposed between a lost motion piece 93 secured to the shift shaft 97 and the shift drum 95. In this way, a lost motion mechanism K is configured between the diff-lock actuator 105 and the shift drum 95.

The reason for the necessity of such a lost motion mechanism is as below. Even if the diff-lock actuator 105 is driven to bring the differential mechanism into the differential lock state, there is a possibility that a state where the diff-lock pin 83 cannot be fitted into the pin hole 83a occurs until the relative rotation occurs between the differential case 84 and the right cam face 86. In the present embodiment, the following state is referred to as "the differential lock waiting state". Although the diff-lock actuator 105 has been driven, the diff-lock pin 83 cannot be slid so as to bring a state of waiting switching into the differential lock state. In this "differential lock waiting state," if appropriate relative rotation occurs between the differential case 84 and the right cam face 86, then the diff-lock pin 83 will be pressed into the pin hole 83a by the reactive force of the lost motion spring 95.

In the present embodiment, a differential lock fitting state sensor 106, which detects the shift drum 95 turned to a given position, is provided to detect the fitting of the diff-lock pin 83 and shifting of the differential mechanism into the differential lock state. "The differential lock waiting state" can be detected by monitoring the driving state of the diff-lock actuator 105 on the basis of the turning state of the shift shaft 97, and the like.

Figure 6:
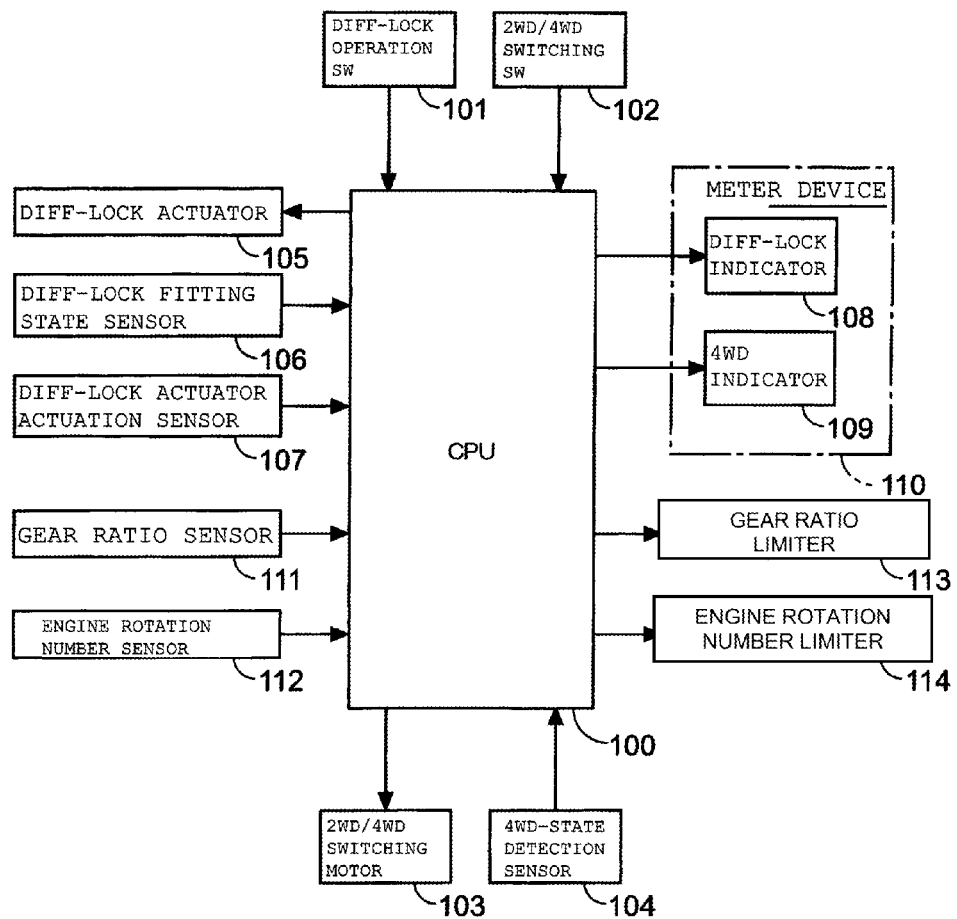
FIG. 6 is a block diagram illustrating a configuration of a differential lock control system according to the present embodiment.

FIG. 6 is a block diagram illustrating a configuration of a differential lock control system according to the present embodiment. A CPU 100 serves as a control section of the deferential lock control system. This CPU 100 exercises various control so that when an occupant is to switch the front wheel differential mechanism 12 into the deferential lock state, the vehicle is prevented from traveling at high speed in the differential lock state. In addition, switching into the differential lock state is prevented during high-speed traveling and is made smoothly in a low-speed area.

The CPU 100 receives operation signals from a diff-lock operation SW (switch) 101 and from a 2WD/4WD switching SW 102. These switches can be installed close to the steering handlebar 2, i.e., at a position where they can easily be operated while the occupant mounts on the vehicle. The CPU 100 receives output signals from the differential lock fitting state sensor 106, a diff-lock actuator actuation sensor 107, a gear ratio sensor 111 as gear ratio detector, which detects a gear ratio of the transmission, an engine rotation number sensor 112 as a engine rotation number detector, and a 4WD-state detection sensor 104.

The differential actuator actuation sensor 107 is composed of a sensor for detecting a position of a power transmission member located between the output shaft 98 (see FIG. 5) of the diff-lock actuator 105 and the lost motion piece 93. Incidentally, the differential actuator actuation sensor 107 may be a sensor for detecting a drive signal of the diff-lock actuator 105.

The engine rotation number sensor 112 can be composed of a non-contact sensor for detecting the rotation speed of the crankshaft 42, or the like. The gear ratio sensor 111 can be composed of a sensor for detecting the turning position of a shift drum (not shown) selecting a speed-change gear pair if a transmission is the multistage transmission as in the present embodiment.

The gear ratio sensor 111 can be modified in various ways. In a transmission where speed-change gear pairs are switched by making the switch between the engagement and disengagement states of a plurality of shift clutches, a gear ratio can be determined based on the engagement and disengagement states of the plurality of shift clutches. Further, in various continuously variable transmissions, a gear ratio can be determined based on the position or the like of a member driven to vary the gear ratio.

The diff-lock actuator 105, the 2WD/4WD switching motor 103, a gear ratio limiter 113, and an engine rotation number limiter 114 are connected to the CPU 100. The 2WD/4WD switching motor 103 is a drive source connected to the slide arm 76 (see FIG. 5) of the 2WD/4WD switching mechanism 70 to slide the slide piece 74.

Further, a meter device 110 connected to the CPU 100 includes a diff-lock indicator 108 and a 4WD indicator 109. The diff-lock indicator 108 is turned off if the diff-lock operation SW 101 is inoperative. In addition, the diff-lock indicator 108 flickers if the diff-lock operation SW 101 is operated to bring "the differential lock waiting state." Further, the diff-lock indicator 108 is turned on if the switching into the differential lock state is completed. In the present embodiment, if the diff-lock actuator actuation sensor 107 detects the actuation of the diff-lock actuator 105 and the diff-lock fitting state sensor 106 detects the unlocking state, a determination is made as "the differential lock waiting state."

The 4WD indicator 109 is configured to be lit if the 4WD state detection sensor 104 detects the switching from the 2WD state to the 4WD state. Incidentally, if the lost motion mechanism is applied to the 2WD/4WD switching mechanism, the 4WD indicator 109 may be made to flicker after the detection of "the 4WD switching waiting state."

A gear ratio limiter 113 and an engine rotation number limiter 114 are connected to the CPU 100. The gear ratio limiter 113 limits the gear ratio of the transmission under a predetermined condition. The engine rotation number limiter 114 limits the rotation number of the engine under a predetermined condition. In the present embodiment, the whole including the CPU 100, each sensor and the gear ratio limiter is referred to as the differential lock control system.

Figure 7:
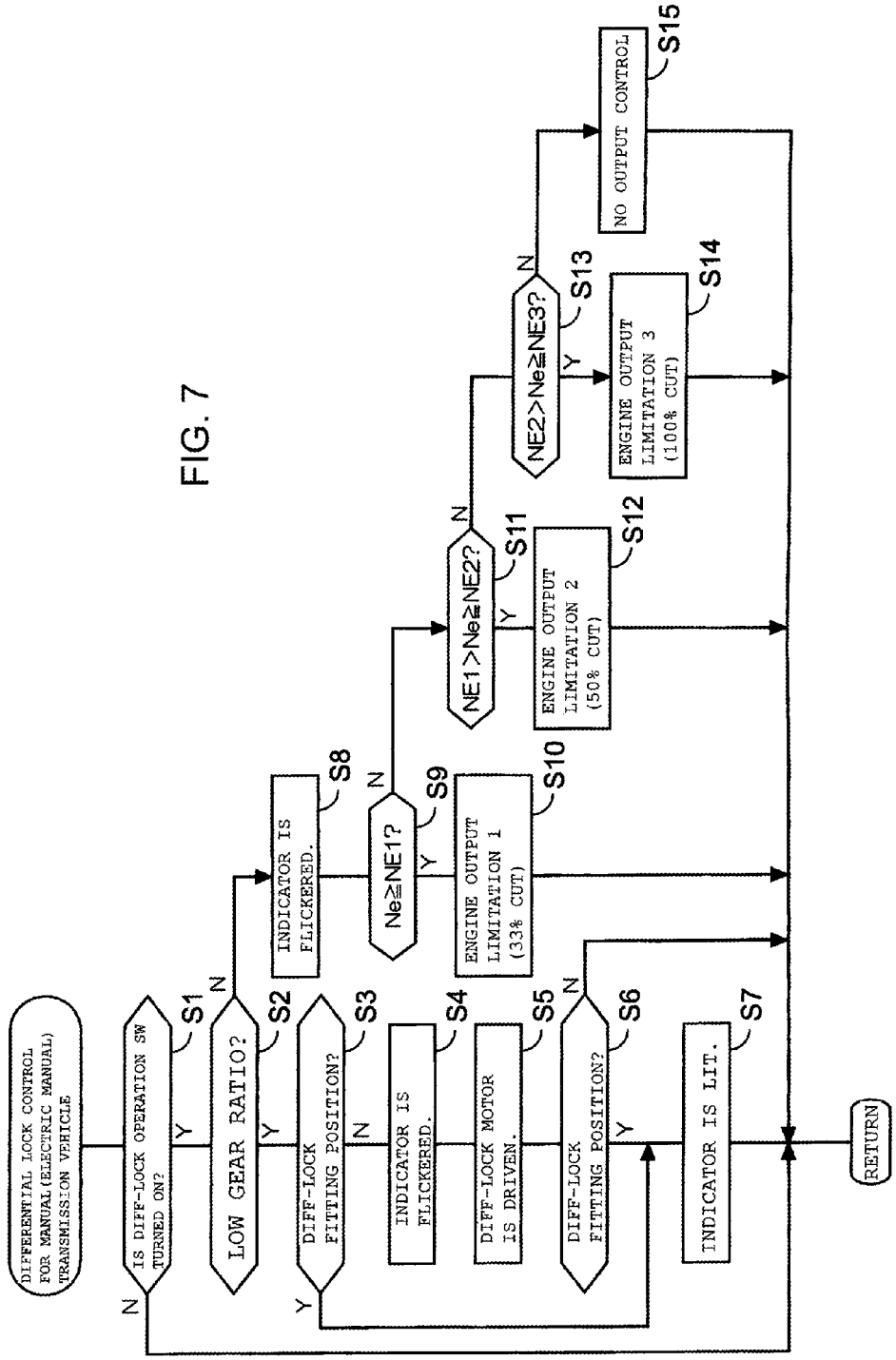
FIG. 7 is a flowchart for illustrating a procedure for differential lock control in an engine with manual transmission specifications.

FIG. 7 is a flowchart for illustrating a procedure for the differential lock control system in the engine 15 having the manual transmission specifications shown in FIG. 4. Incidentally, the flowchart deals with also "an electric manual transmission" in which a shift drum is turned by a shift actuator (not shown). The differential lock control described below can be applied to 4WD-traveling time.

In step S1, a determination is first made as to whether or not the diff-lock operation SW 101 is turned on. If an affirmative determination is made in step S1, control proceeds to step S2. If a negative determination is made, control is ended as it is. In step S2, a determination is made based on the output of the gear ratio sensor 111 as to whether or not to be in a low gear ratio state. If the first, second or reverse gear is selected in the present embodiment, the CPU 100 determines to be in the low gear ratio state and control proceeds to step S3.

In step S3, a determination is made based on the output of the diff-lock fitting state sensor 106 as to whether or not the diff-lock pin 83 is at the diff-lock fitting position. If a negative determination is made in step S3, the differential mechanism is in "the differential lock waiting state" and control proceeds to be step S4, in which the diff-lock indicator 108 is flickered. In a subsequent step S5, the diff-lock actuator 105 is continuously driven and control proceeds to step S6. In step S6, a determination is again made as to whether or not the diff-lock pin 83 is at the diff-lock fitting position. If an affirmative determination is made, control proceeds to step S7. In step S7, the diff-lock indicator 108 is lit and a sequence of control is ended.

According to the flow of differential lock control described above, if the diff-lock operation SW 101 is operated in the low gear ratio state, the diff-lock actuator 105 is actuated and the differential mechanism is brought into "the differential lock waiting state." In such a case, the diff-lock indicator 108 is flickered to make it possible to inform the occupant of such a state. If the switching to the diff-lock state is completed, it is possible to light the diff-lock indicator 108 to promptly inform the occupant of such a thing.

On the other hand, in step S2, if a negative determination is made, i.e., if it is determined that the transmission is not in the low gear ratio state but in a high gear ratio state where the third-, fourth- or fifth-gear is selected, control proceeds to step S8, in which the diff-lock indicator 108 is flickered. In other words, if the diff-lock operation SW 101 is operated in the high gear ratio state, the same flicker control as that of "the differential lock waiting state" is exercised without actuating the diff-lock actuator 105.

In the present embodiment, if the diff-lock operation SW 101 is operated in the high gear ratio state, the engine rotation number limiter 114 (see FIG. 6) exercises the engine rotation number (engine output) limiting control. The engine rotation number limiter 114 exercises thinned-out control on a fuel injection system and an ignition system so that the engine rotation number may not exceed a given upper limit (e.g. 2800 rpm). In addition, if the diff-lock operation SW 101 is operated in a state where the engine rotation number is high, the rotation number limiter 114 exercises such control as to reduce output stepwise to achieve a feeling of smooth deceleration.

In step S9 subsequent to step S8, it is determined whether or not an engine rotation number (Ne) is equal to or greater than a predetermined value NE1 (e.g. 5000 rpm). In step S9, if an affirmative determination is made, control proceeds to step S10. In step S10, engine output control is exercised in which the reduction degree of the engine output is set at a low level (e.g. the reduction of 33%). Then, a sequence of control is ended.

If a negative determination is made in step S9, control proceeds to step S11. In step S11, it is determined whether or not the engine rotation number (Ne) is less than the predetermined value NE1 (e.g. 5000 rpm) and equal to or greater than a predetermined value NE2 (e.g. 4000 rpm). If an affirmative determination is made in step S11, control proceeds to step S12. In step S12, engine output control is exercised in which the reduction degree of the engine output is set at a generally middle level (e.g. the reduction of 50%). Then, a sequence of control is ended.

Further, if a negative determination is made in step S11, control proceeds to step S13. In step S13, it is determined whether or not the engine rotation number (Ne) is less than the predetermined value NE2 (e.g. 4000 rpm) and equal to or greater than a predetermined value NE3 (e.g. 3000 rpm). If an affirmative determination is made in step S13, control proceeds to step S14. In step S14, engine output control is exercised in which the reduction degree of the engine output is set at a high level (e.g. the reduction of 100%). Then, a sequence of control is ended.

Incidentally, if a negative determination is made in step S13, i.e., if the engine rotation number Ne drops to a level less than 3000 rpm, control proceeds to step S15, in which the output is not limited. Then a sequence of control is ended.

According to the differential lock control described above, when the diff-lock operation SW 101 is operated, if the transmission is at the predetermined gear ratio (first, second or reverse gear), any control is not done. This is because of the following. As long as the predetermined low gear ratio is selected, even if the engine rotation number rises up to a revolution limit, travelling in the differential lock state is not likely to pose a problem.

On the other hand, when the diff-lock operation SW 101 is operated, if the transmission is at the high gear ratio (third, fourth or fifth gear) and the engine rotation number is higher than the predetermined value (e.g. 3000 rpm), the engine rotation number control according to the magnitude of the engine rotation number is exercised. This is because of the following. If the engine output control encountered when the diff-lock operation SW 101 is operated is set uniformly, the reduction degree of the engine output is increased when the diff-lock operation SW 101 is operated during travelling in the high-rotation state. This gives an occupant a large feeling of deceleration. In the present embodiment, the differential lock control is set such that as the engine rotation number is increased, the limitation degree of the engine output is gradually reduced. This achieves the smooth deceleration control and the third, fourth and fifth gears have the same upper limit value of the engine rotation number. Thus, the occupant is promoted to operate shifting to the low gear ratio at which the drive of the diff-lock actuator is permitted.

Figure 8:
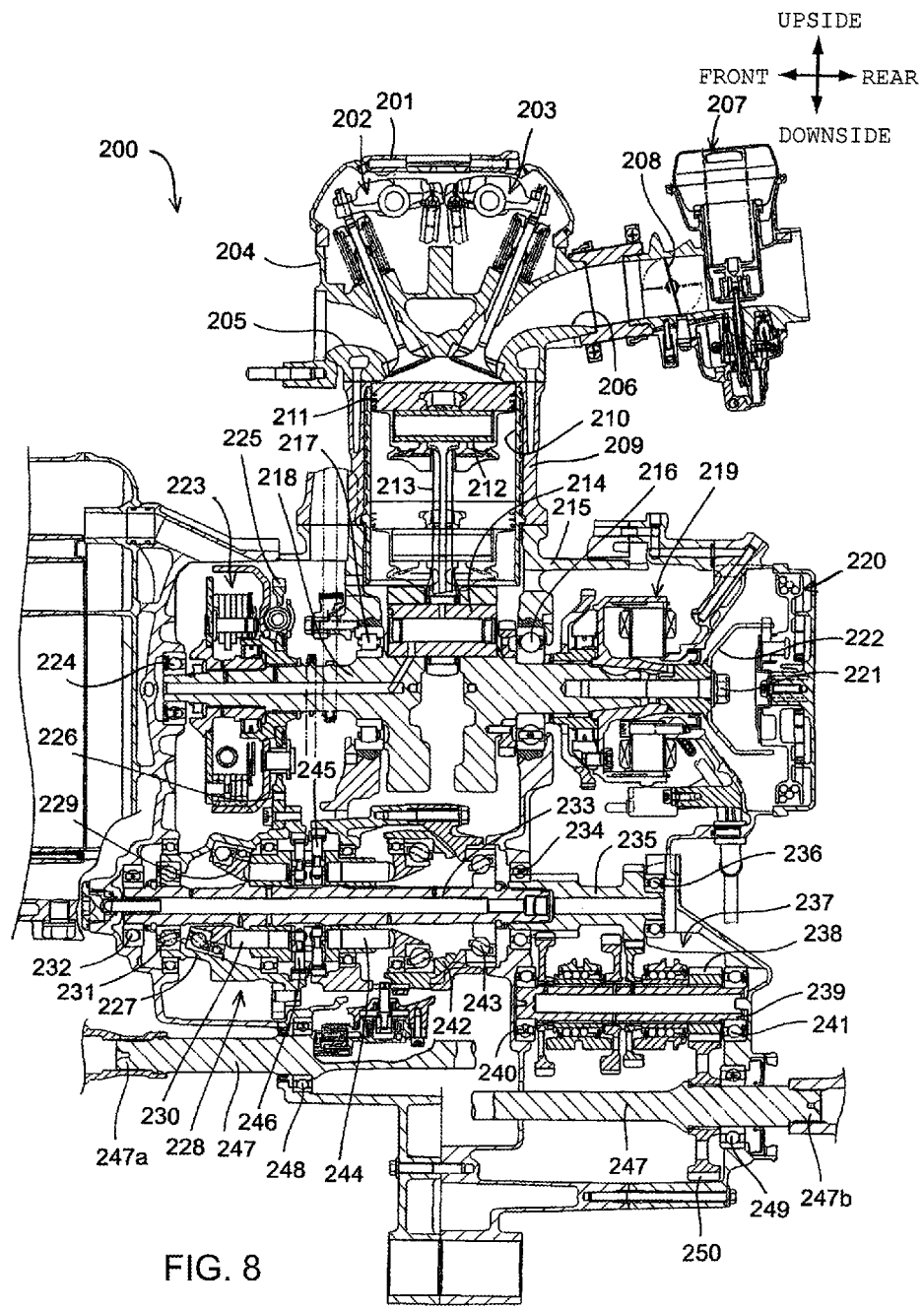
FIG. 8 is a cross-sectional view of an engine according to a second embodiment of the present invention.

FIG. 8 is a cross-sectional view of an engine 200 according to a second embodiment of the present invention. Differential lock control of the present invention is characterized by being set up in different ways in accordance with the types of transmissions. The engine 200 is a single-cylinder four-cycle engine provided with a hydraulic mechanical type continuously variable transmission 228 and is applied to the straddle-ride type four-wheeled vehicle 1 depicted in FIG. 1.

The engine 200 is provided with a centrifugal clutch 223 between a crankshaft 218 and the hydraulic mechanical type continuously variable transmission 228. The centrifugal clutch 223 is adapted to prohibit the transmission of drive force until an engine rotation number will exceed a predetermined value. The engine 200 is configured to enable start and shifting operations without the necessity of manual clutch operation. A front end portion 247a of a final output shaft 247 is coupled to a front propeller shaft 11 (see FIG. 1). On the other hand, a rear end portion 247b of the final output shaft 247 is coupled to a rear propeller shaft 13.

A piston 211 is slidably housed in a sleeve 210 embedded in a cylinder block 209. The piston 211 is pivotally supported by one end of a connecting rod 213 via a piston pin 212. The connecting rod 213 has the other end supported pivotally by the crankshaft 218 via a crankpin 214. A cylinder head 204 housing an intake valve mechanism 203 and an exhaust valve mechanism 202 is mounted on the upper portion of the cylinder block 209. A fuel vaporizer (a carburetor) 207 and a throttle valve 208 are mounted on the upstream side of an intake port 206 of a cylinder head 204. On the other hand, an exhaust pipe (not shown) coupled to a muffler 9 in the rear portion of the vehicle body is mounted on the downstream side of an exhaust port 205. A cylinder head cover 201 is mounted above a rocker arm driving intake and exhaust valves.

The crankshaft 218 is rotatably supported by bearings 216, 217 provided on the crankcase 215. A collar 222 is secured to a right end, in the figure, of the crankshaft 218 by means of a bolt 221. The collar 222 is used to connect a pulley of a recoil starter 220 with the crankshaft 218. An AC generator 219 is secured to the crankshaft 218 at a position between the collar 222 and a bearing 216.

A left end portion, in the figure, of the crankshaft 218 is rotatably supported by a bearing 224 attached to the crankcase 215. A start clutch 223 composed of a centrifugal clutch is mounted between the bearing 224 and the bearing 217. The start clutch 223 is configured to transmit the rotational power to a driven side primary gear 226 of the hydraulic mechanical type continuously variable transmission 228 via a drive side primary gear 225 if the crankshaft 218 exceeds a predetermined rotation frequency.

The driven side primary gear 226 is adapted to rotate a pump case 227 of the hydraulic mechanical type continuously variable transmission 228. The rotational power is reduced at a predetermined reduction ratio and outputted to an output shaft 233. A pump swash plate 229 is driven and rotated by the rotational power of the pump case 227 to reciprocate pump pistons 230 arranged at regular intervals around the output shaft. A cylinder portion housing a plurality of radially arranged pump side distributor valves 246 and motor side distributor valves 245 is secured to the output shaft 233. Motor pistons 244 in contact with a motor swash plate 242 are arranged, on the right side of the cylinder portion in the figure, at regular intervals around the output shaft 233. The motor swash plate 242 is configured to change its inclination angle by a shift actuator (not shown). The rotation of the pump case 227 is reduced at a given gear ratio in accordance with the angle of the motor swash plate 242 and is transmitted to the output shaft 233.

A left end portion, in the figure, of the output shaft 233 is rotatably supported by a bearing 232 installed on the crankcase 215 and by a bearing 231 supporting the pump case 227. A right side, in the figure, of the output shaft 233 is rotatably supported by a bearing 243 of the case portion housing the motor swash plate 242. An extension shaft 235 is non-rotatably fitted to the right end portion, in the figure, of the output shaft 233 and rotatably supported by bearings 234, 236. A speed-change gear 237 attached to a second output shaft 239 is engaged with the extension shaft 235. The rotational power transmitted to the second output shaft 239 rotatably supported by bearings 240, 241 is transmitted to a driven side output gear 250 secured to the final output shaft 247 from the drive side output gear 238. The final output shaft 247 is rotatably supported by bearings 248, 249 of the crankcase 215. When the rotational power of the engine 200 is transmitted via reverse system gears engaged with the second output shaft 239, the final output shaft 247 is rotated and driven in the reverse direction.

Figure 9:
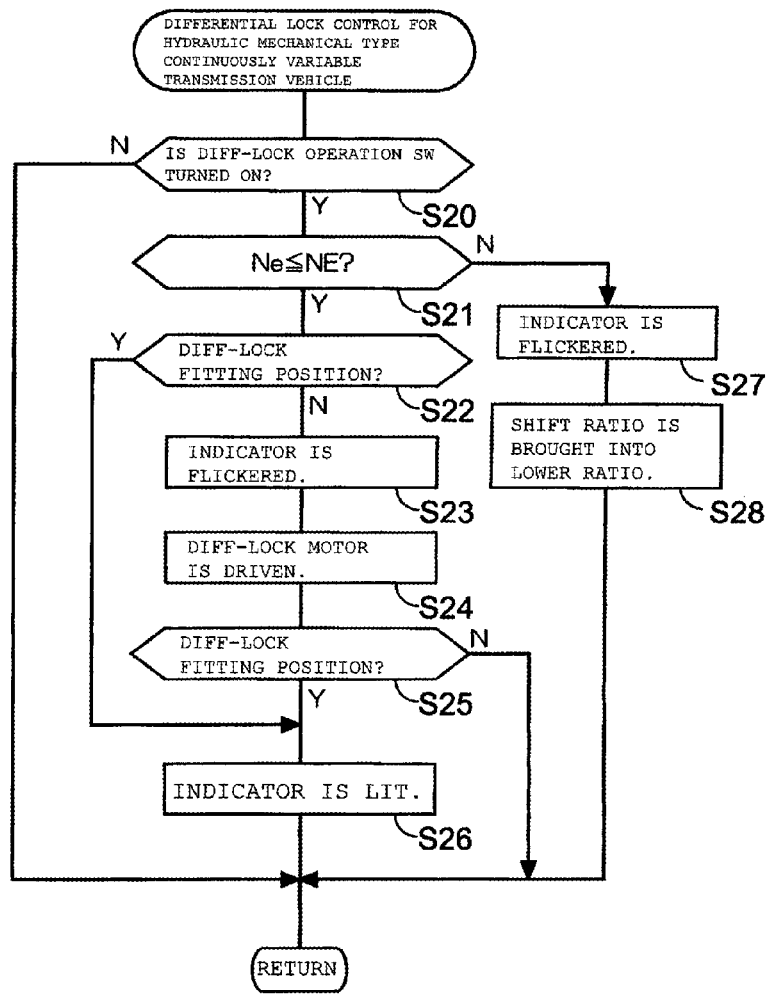
FIG. 9 is flowchart for illustrating a procedure for differential lock control in an engine with hydraulic mechanical type continuously variable transmission specifications.

FIG. 9 is a flowchart for illustrating a procedure for differential lock control in the engine 200 having hydraulic mechanical type continuously variable transmission specifications shown in FIG. 8. In step S20, it is determined whether or not the diff-lock operation SW 101 is turned on. If an affirmative determination is made in step S20, control proceeds to step S21. Incidentally, if a negative determination is made in step S20, control is ended as it is.

In step S21, it is determined whether or not an engine rotation number (Ne) is equal to or less than a predetermined value NE (e.g., 1750 rpm). The predetermined value NE is an upper limit at which drive force is not transmitted to the output shaft 233 of the hydraulic mechanical type continuously variable transmission 228. For example, the predetermined value NE is set at an engagement rotation number of the start clutch 223.

If an affirmative determination is made in step S21, in other words, if the engine rotation number (Ne) is in a low rotation area in which the drive force is not transmitted to the front wheel WF, control proceeds to step S22. In step S22, it is determined whether or not the diff-lock pin 83 is at the diff-lock fitting position on the basis of the output of the diff-lock fitting state sensor 106. If a negative determination is made in step S22, control is determined to be in "the differential lock waiting state" and proceeds to step S23. In step S23, the diff-lock indicator 108 is flickered.

In subsequent step S24, the diff-lock actuator 105 is continuously driven and control proceeds to step S25. In step S25, it is determined whether or not the diff-lock pin 83 is at the diff-lock fitting position. If an affirmative determination is made, control proceeds to step S26, in which the diff-lock indicator 108 is lit. Then, a sequence of control is ended. Incidentally, if an affirmative determination is made in step S22, control skips steps S23, S24 and S25 and proceeds to step S26. If a negative determination is made in step S25, control is ended as it is.

If a negative determination is made in step S21, i.e., if the engine is in a high-rotation state where the drive force is transmitted to the front wheel WF, control proceeds to step S27, in which the diff-lock indicator 108 is flickered. In other words, if the engine is in the high-rotation state and the diff-lock indicator 108 is flickered, the diff-lock actuator 105 is not actuated and flicker control is exercised similarly to "the differential lock waiting state."

In step S28, the gear ratio limiter 113 (see FIG. 6) drives the shift actuator, which changes the inclination angle of the pump swash plate 242 (see FIG. 8), thereby achieving a lowered change gear ratio. This lowered change gear ratio is set so that vehicle speed may not exceed a predetermined low-speed (e.g., 20 mph) regardless of the magnitude of the engine rotation number. This setting along with the flicker control of the diff-lock indicator 108 can promote the occupant to close the throttle for deceleration so as to shift into the differential lock state in the low-speed area.

According to the flow of the differential lock control described above, the diff-lock operation SW 101 may be operated when the engine rotation number is equal to or less than the predetermined value. The diff-lock actuator 105 may be actuated and the differential mechanism may be in "the differential lock waiting state." In such a case, the diff-lock indicator 108 is flickered to make it possible to inform the occupant of such a state. The diff-lock operation SW 101 may be operated in a high-rotation state where the engine rotation number exceeds the predetermined value. In such a case, the diff-lock indicator 108 is flicker-controlled and the gear ratio limiter 113 drives the shift actuator to achieve the predetermined lowered gear ratio. Thus, the occupant can be promoted to perform deceleration.

Figure 10:
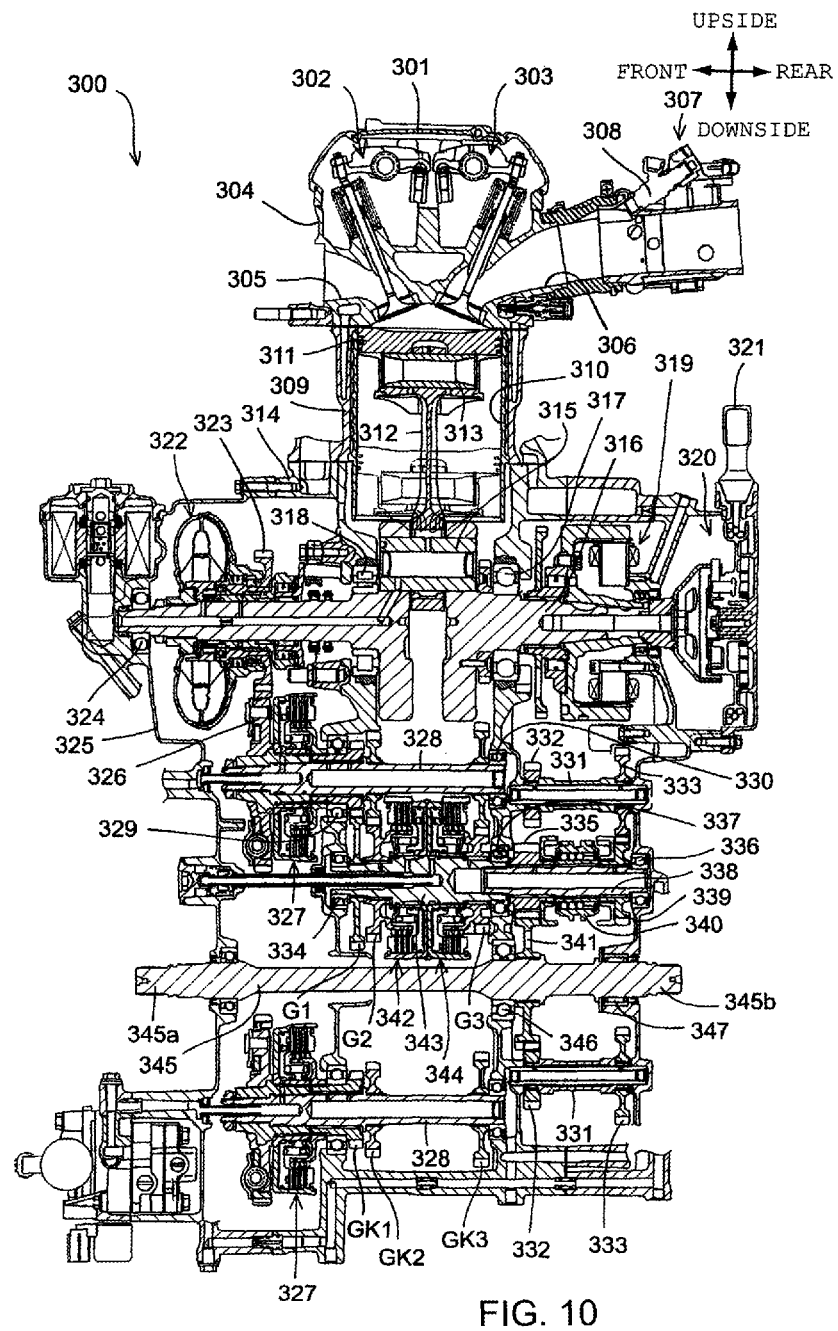
FIG. 10 is a cross-sectional view of an engine according to a third embodiment of the present invention.

FIG. 10 is a cross-sectional view of an engine 300 according to a third embodiment of the present invention. The engine 300 is a single-cylinder four-cycle engine provided with a transmission combining a three-speed automatic transmission with a torque converter and can be applied to the straddle-ride type four-wheeled vehicle shown in FIG. 1.

The engine 300 is provided with a torque converter 322 between the crankshaft 316 and a three-speed automatic transmission. The torque converter 322 is adapted to prohibit the transmission of drive force until an engine rotation number will exceed a predetermined value. The engine 300 is configured to enable start and shifting operations without the necessity of manual clutch operation. A front end portion 345a of a final output shaft 345 is coupled to a front propeller shaft 11 (see FIG. 1). On the other hand, a rear end portion 345b of the final output shaft 345 is coupled to a rear propeller shaft 13.

A piston 311 is slidably housed in a sleeve 310 embedded in a cylinder block 309. The piston 311 is pivotally supported by one end of a connecting rod 312 via a piston pin 313. The connecting rod 312 has the other end supported pivotally by the crankshaft 316 via a crankpin 315. A cylinder head 304 housing an intake valve mechanism 303 and an exhaust valve mechanism 302 is mounted on the upper portion of the cylinder block 309. An injector 308 of a fuel injection device and a throttle body 307 provided with a throttle valve (not shown) are mounted on the upstream side of an intake port 306 of a cylinder head 304. On the other hand, an exhaust pipe (not shown) coupled to a muffler 9 in the rear portion of the vehicle body is mounted on the downstream side of an exhaust port 305. A cylinder head cover 301 is mounted above a rocker arm driving intake and exhaust valves.

The crankshaft 316 is rotatably supported mainly by bearings 317, 318, and 324 provided on the crankcase 314. A recoil starter 320 is provided at the right end portion, in the figure, of the crankshaft 316. The recoil starter 320 is used to rotate the crankshaft 316 for starting the engine by pulling a grip 321 attached to an end of a rope. An AC generator 319 is disposed between the recoil starter 320 and the bearing 317.

If the crankshaft 316 exceeds a predetermined rotation frequency, the torque converter 322 transmits rotational power via a drive side primary gear 323 and a driven side primary gear 326 to a main shaft 328 rotatably supported by bearings 329, 330.

A first-speed clutch 327 is disposed adjacently to the driven side primary gear 326. If the first-speed clutch 327 is in an engagement state, the rotational power of the main shaft 328 is transmitted to a counter shaft 343 via a driven side first gear G1. A second-speed clutch 342 and a third-speed clutch 344 are back-to-back attached to the counter shaft 343. If the second-speed clutch 342 is in the engagement state, the rotational power of the main shaft 328 is transmitted to the counter shaft 343 via a driven side second gear G2. On the other hand, if the third-speed clutch 344 is in the engagement state, rotational power of the main shaft 328 is transmitted to counter shaft 343 via a driven side third gear G3. A drive side first gear GK1, a drive side second gear GK2 and a drive side third gear GK3 are attached to the main shaft 328 so as to mesh with the driven side gears G1, G2 and G3, respectively.

The three-speed automatic transmission according to the present embodiment is configured such that the first-, second- and third-speed clutches are automatically controlled for engagement and disengagement to automatically shift among the first-, second- and third-speeds in accordance with the engine rotation number, vehicle speed and the like. The first-, second-, and third-speed clutches are of a hydraulic type. In this hydraulic type, control hydraulic pressure produced by a hydraulic pump is distributed by solenoid valves into the clutches to control the engagement and disengagement states of each clutches.

The counter shaft 343 is rotatably supported by bearings 334, 337 and has a right end portion, in the figure, to which an extension shaft 338 is coaxially fitted. A speed-change sleeve 340 adapted to make the switch between forward and reverse is attached to the extension shaft 338. The extension shaft 338 is rotatably supported at its right end portion, in the figure, by a bearing 336. On the forward side, rotational power is transmitted from a drive side output gear 335 of the extension shaft 338 via a driven side output gear 341 to the final output shaft 345. The final output shaft 345 is rotatably supported by bearings 346, 347 at a rightward position in the figure.

A reverse output transmission gear 333 and a drive side reverse output gear 332 are attached to a reverse shaft 331 disposed adjacently to the extension shaft 338. When the reverse side is selected, power is transmitted from a reverse output gear 339 of the extension shaft 338 via the reverse output transmission gear 333, the reverse shaft 331 and the drive side reverse output gear 332 to the driven side output gear 341.

Figure 11:
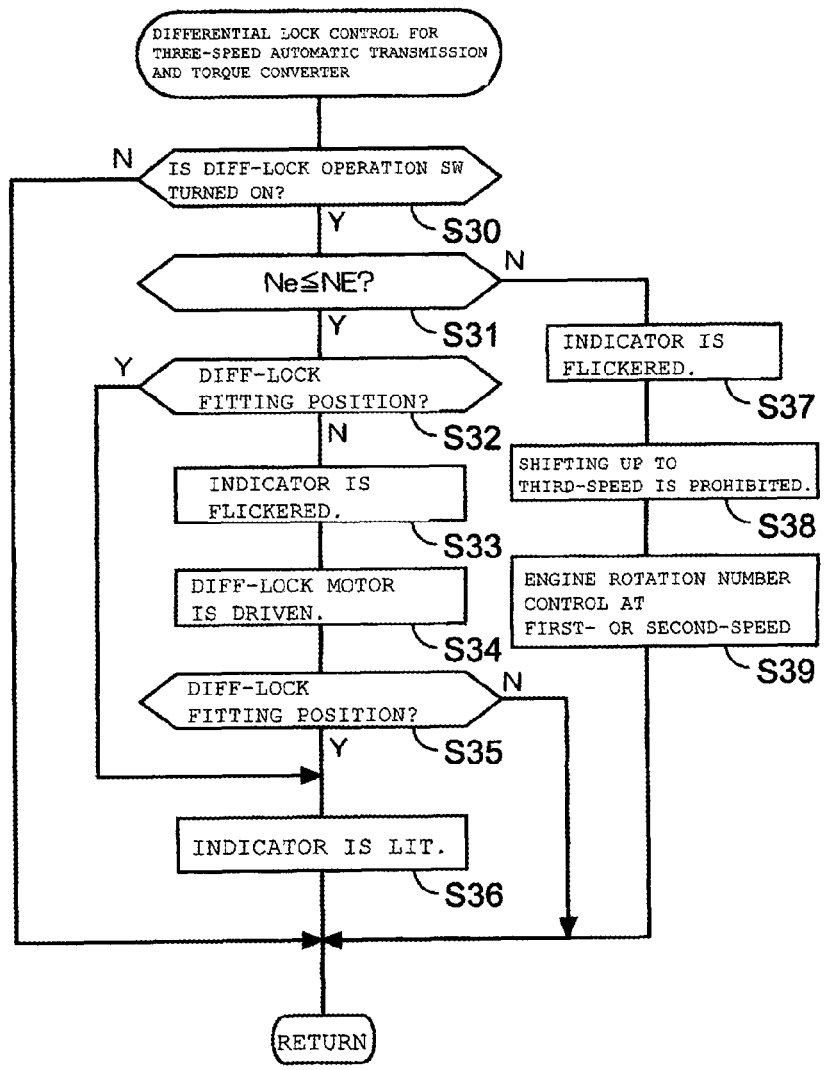
FIG. 11 is a flowchart for illustrating a procedure for differential lock control in an engine with three-speed automatic transmission and torque converter specifications.

FIG. 11 is a flowchart illustrating a procedure for differential lock control of the engine 300 having three-speed automatic transmission and torque convertor specifications shown in FIG. 10. In step S30, it is determined whether or not the diff-lock operation SW 101 is turned on. If an affirmative determination is made in step S30, control proceeds to step S31. In step S31, if a negative determination is made, control is ended as it is.

In step S31, it is determined whether or not an engine rotation number (Ne) is equal to or less than a predetermined value NE (e.g. 3300 rpm). This predetermined value NE is an upper limit at which drive force is not transmitted from the torque converter 322 to the main shaft 328. In addition, the predetermined value NE is arbitrarily set in accordance with the characteristics of the torque converter to be applied.

In step S31, if an affirmative determination is made, in other words, if it is determined that the engine is in a low-rotation area where the drive force is not transmitted to the front wheel WF, control proceeds to step S32. In step S32, it is determined whether or not the diff-lock pin 83 is at a diff-lock fitting position on the basis of the output of a diff-lock fitting state sensor 106. If a negative determination is made in step S32, it is determined that the differential mechanism is in "the differential lock waiting state" and control proceeds to step S33. In step S33, the diff-lock indicator 108 is flickered.

In subsequent step S34, the diff-lock actuator 105 is continuously driven and control proceeds to step S35. In step S35, it is again determined whether or not a diff-lock pin 83 is at the diff-lock fitting position. If an affirmative determination is made, control proceeds to step S36. In step S36, the diff-lock indicator 108 is lit. Then, a sequence of control is ended.

If an affirmative determination is made in step S32, control skips steps S33, 34 and 35 and proceeds to step S36. If a negative determination is made in step S35, control is ended as it is.

In step S31, if a negative determination is made, i.e., if the engine is in a high-rotation state where the drive force is transmitted to the front wheel WF, control proceeds to step S37. In step S37, the diff-lock indicator 108 is flickered. In other words, if the engine is in the high-rotation state and the diff-lock operation SW 101 is operated, the diff-lock actuator 105 is not operated and the flicker control is exercised similarly to "the differential lock waiting state."

In step S38, clutch control for prohibiting shifting up to the third speed is next exercised to keep the low gear ratio state. Further, in step S39, engine rotation number control is exercised so that the engine rotation number may not exceed a predetermined upper limit (e.g., 4800 rpm).

According to the flow of the differential lock control described above, the diff-lock operation SW 101 may be operated when the engine rotation number is equal to or less than the predetermined value. In addition, the diff-lock actuator 105 may be actuated and the differential mechanism may be in "the differential lock waiting state." In such a case, the diff-lock indicator 108 is flickered to make it possible to inform the occupant of such a state. The diff-lock operation SW 101 may be operated in a high-rotation state where the engine rotation number exceeds the predetermined value. In such a case, not only the diff-lock indicator 108 is flicker-controlled but the gear ratio limiter 113 prohibits shifting up to the third-speed to execute the maintenance of the predetermined lowered gear ratio. In addition, the engine rotation number limiter 114 exercises control so that the engine rotation number may not exceed the predetermined value. Thus, the occupant can be promoted to perform deceleration. In other words, although shifting between the first-speed and the second-speed is possible, the engine rotation number is limited to the predetermined upper limit value. Therefore, an occupant can be promoted to close the throttle for deceleration so that the differential mechanism may be shifted into the diff-lock state in the low-speed area.

FIG. 12 is a table for illustrating contents of the differential lock control in the transmissions of the three types. Firstly, in the specifications of the five-speed manual transmission (or the five-speed manual electric transmission) shown in FIG. 4, the operation permission conditions of the diff-lock actuator 105 are that the transmission is at the gear ratio of first-speed, second-speed or reverse. Therefore, as long as the gear ratio is in a low state, even if the engine rotation number rises, it falls in the range of low vehicle-speed. Thus, smooth shifting to the differential lock state can be expected in the low vehicle-speed range.

On the other hand, the speed limiting method after the actuation of the diff-lock actuator does not involve any limitation if the transmission is at the gear ratio of first-speed, second-speed or reverse. In contrast, if the transmission is at the gear ratio of third-speed, fourth-speed or fifth-speed, the engine rotation number is limited to the common upper limit value. If the engine rotation number is in the high-rotation state when the diff-lock operation SW 101 is operated, the degree of output limitation is set according to the magnitude of the engine rotation number. Specifically, as the engine rotation number is higher, the degree of output limitation is made smaller. In addition, as the engine rotation number is lower, the degree of output limitation is made larger. In this way, smooth deceleration can be accomplished. However, if the transmission is at the gear ratio of third-speed, four-speed or fifth-speed, the common control of engine rotation number is exercised in any case of the differential lock state and the differential lock waiting state (the unlock state).

In the present embodiment, even the five-speed electric manual transmission where the shift drum is turned by the actuator does not execute shift limitation. However, because of the addition of the limitation of the engine rotation number, the transmission is not brought into the high vehicle-speed state unsuitable for the differential lock state. Incidentally, a speed-change stage at which the actuation of the diff-lock actuator is permitted and a speed-change stage at which the output limitation of an engine is executed are arbitrarily changed according to the characteristic of the engine. For example, the speed-change stage at which the actuation of the actuator is permitted may be set at a gear ratio of first-speed or reverse gear. In addition, the output limitation of an engine may be executed at a gear ratio of second- or more speed gear.

Secondly, in the specifications of the hydraulic mechanical type continuously variable transmission shown in FIG. 8, the actuation permission condition of the diff-lock actuator 105 is the engine rotation number at which the drive force of the front wheel WF is not produced. This rotation number can be set with reference to the engagement rotation number of the start clutch installed between the crankshaft and the hydraulic mechanical type continuously variable transmission. If the transmission is configured without the start clutch, the rotation number can be set with reference to a boundary rotation number at which rotational power is transmitted to the output shaft, by setting the hydraulic mechanical type continuously variable transmission side.

On the other hand, the speed limiting method after the actuation of the diff-lock actuator involves control for fixing, at a predetermined low gear ratio, a gear ratio (a speed-change ratio) that can be changed in a non-step manner by the shift actuator. Incidentally, the predetermined low gear ratio can be set at a value at which, e.g., vehicle speed does not exceed 20 mph. Alternatively, the predetermined low gear ratio can arbitrarily be set according to the characteristics of the engine.

Thirdly, in the specifications of the third-speed automatic transmission and torque convertor shown in FIG. 10, the actuation permission conditions of the diff-lock actuator 105 are that the first-speed gear of the automatic transmission is selected and the engine is at an engine rotation number at which the drive force of the front wheel WF is not produced. This rotation number can be set with reference to the drive force production rotation number of the torque convertor installed between the crankshaft and the third-speed automatic transmission.

On the other hand, the speed limiting method after the actuation of the diff-lock actuator involves control exercised such that shifting up to third-speed is prohibited and first- and second-speeds have the same engine rotation number set as an upper limit. In this way, vehicle speed is prevented from increasing over the predetermined value. Incidentally, the actuation permission condition of the diff-lock actuator and the output limitation of the engine can arbitrarily be varied according to the characteristics of the engine and the transmission. For example, a speed-change stage at which the output limitation of the engine is executed may be set at only the first-speed, and shifting up to second- and third-speeds may be prohibited.

Incidentally, the structure of the engine and transmission, the structure and arrangement of the differential mechanism and differential locking mechanism, the structure and arrangement of the diff-lock actuator, the structures and arrangements of the various sensors and switches, the structure and arrangement of the diff-lock indicator, setting of drive force transmission rotation numbers of the starter clutch and torque convertor, etc., are not limited to the embodiments described above but can be modified in various ways. For example, various sensors such as the diff-lock fitting state sensor, the 4WD state detection sensor and the like may not be of the contact-mechanical type in which the detection element projects and retracts in response to the movement of the to-be-detected member but may be of a non-contact type using a Hall element or the like, or of other types. The diff-lock actuator for driving the differential locking mechanism is not limited to the electric motor but may be a hydraulic cylinder or the like.

DESCRIPTION OF REFERENCE NUMBERS

1 . . . . Straddle-ride type four-wheeled vehicle, 11 . . . . Front propeller shaft, 12 . . . . Differential mechanism, 15, 200, 300 . . . . Engine, 22 . . . . Drive shaft, 70 . . . 2WD/4WD switching mechanism, 80 . . . . Differential gear portion, 83 . . . . Diff-lock pin, 84 . . . . Diff-case, 90 . . . . Differential locking mechanism, 100 . . . CPU (control section), 101 . . . . Diff-lock operation SW (operation switch), 102 . . . 2WD/4WD switching SW, 104 . . . 4WD state detection sensor, 105 . . . . Diff-lock actuator, 106 . . . . Diff-lock fitting state sensor, 107 . . . . Diff-lock actuator actuation sensor, 108 . . . . Diff-lock indicator, 109 . . . 4WD indicator, 110 . . . . Meter device, 111 . . . . Gear ratio sensor (gear ratio detector), 112 . . . . Engine rotation number sensor (engine rotation number detector), 113 . . . . Gear ratio limiter, 114 . . . . Engine rotation number limiter, 223 . . . . Start clutch, 228 . . . . Hydraulic mechanical type continuously variable transmission, 322 . . . . Torque convertor, K . . . . Lost motion mechanism, WF . . . . Front wheel, WR . . . . Rear wheel

What is claimed is:

1. A front wheel differential lock control system for a straddle-ride type four-wheel vehicle, comprising:
    a differential mechanism for producing a rotational difference between left and right front wheels driven by an engine;
    an engine rotation number detector, said engine rotation number detector serving to detect an engine rotation number of the engine;
    a device, disposed in a drive force transmission path between the engine and the differential mechanism, to prohibit transmission of drive force to said differential mechanism when the detected engine rotation number is below a predetermined value and to transmit drive force to the differential mechanism when the detected engine rotation number is equal to or greater than the predetermined value;
    a diff-lock actuator for switching the differential mechanism into a differential lock state so as not to produce the rotational difference between the front wheels in response to operation of an operation switch; and
    a control section including a central processing unit for drivingly controlling at least the diff-lock actuator, and
    wherein if the detected engine rotation number is below said predetermined value in which said device does not transmit drive force to said differential mechanism, the control section permits actuation of the diff-lock actuator upon detection of the operation of the operation switch, and wherein if the detected engine rotation number is equal to or above the predetermined value in which said device transits drive force to said differential mechanism, actuation of the diff-lock actuator is prevented and the control section controls engine output until the switching of the differential mechanism to the differential lock state is permitted.

2. A front wheel differential lock control system for a straddle-ride type four-wheel vehicle, comprising:
    a differential mechanism for producing a rotational difference between left and right front wheels driven by an engine;
    an engine rotation number detector, said engine rotation number detector serving to detect an engine rotation number of the engine;
    a device disposed in a drive force transmission path between the engine and the differential mechanism, said device being operable to prevent transmission of drive force to said differential mechanism when the detected engine rotation number is below a predetermined value, and to transmit drive force to the differential mechanism when the detected engine rotation number is equal to or greater than the predetermined value;
    a diff-lock actuator for switching the differential mechanism into a differential lock state so as not to produce the rotational difference between the front wheels in response to operation of an operation switch;
    a control section including a central processing unit for drivingly controlling at least the diff-lock actuator,
    wherein the front wheel differential lock control system further includes a gear ratio detector, said gear ratio detector serving to detect a gear ratio of a transmission of the engine,
    wherein if a predetermined low gear state is detected by the gear ratio detector the control section permits actuation of the diff-lock actuator upon detection of the operation of the operation switch, and wherein if the detected engine rotation number is below said predetermined value such that said device does not transmit drive force to said differential mechanism, the control section permits actuation of the diff-lock actuator upon detection of the operation of the operation switch, and wherein if the predetermined low gear state is not detected by the gear ratio detector or if the detected engine rotation number is above the predetermined value such that said device transmits drive force to said differential mechanism, actuation of the diff-lock actuator is prevented, and upon detection of the operation of the operation switch the control section controls engine output until the switching of the differential mechanism to the differential lock state is permitted, and wherein if it is detected that the transmission of the engine is in a state where a first gear, second gear or reverse gear is selected, the control section determines that the transmission is in the predetermined low gear ratio state, and if the actuation of the diff-lock actuator is permitted, the control section prohibits shifting to a third or more gear thereby limiting the gear ratio of the transmission in the differential lock state.

3. The front wheel differential lock control system for a straddle-ride type four-wheel vehicle according to claim 1,
wherein the device comprises one of a start clutch and a torque converter, and
wherein the predetermined value is equal to a rotation number of drive force transmission start of the start clutch or the torque converter.

4. The front wheel differential lock control system for a straddle-ride type four-wheel vehicle, according to claim 3,
wherein the engine includes a continuously variable transmission continuously varying a gear ratio, and
the control section fixes the gear ratio of the continuously variable transmission at a predetermined low gear ratio in a state where actuation of the diff-lock actuator is permitted.

5. The front wheel differential lock control system for a straddle-ride type four-wheel vehicle according to claim 1, wherein the control section sets a degree of engine output limitation according to a magnitude of the detected engine rotation number.

6. The front wheel differential lock control system for a straddle-ride type four-wheel vehicle according to claim 1, wherein the control section controls engine output until the detected engine rotation number does not exceed said predetermined value.

* * * * *